United States Patent Office 2,830,075
Patented Apr. 8, 1958

2,830,075

2-α-CARBONYLATED 8,13-DIMETHYL POLYHYDROPHENANTHRENE COMPOUNDS AND PREPARATION THEREOF

Nicholas Thomas Farinacci, New York, N. Y.

No Drawing. Application May 10, 1954
Serial No. 428,852

25 Claims. (Cl. 260—468.5)

This application is a continuation in part of my copending application Serial No. 198,895, filed December 2, 1950, and including certain pertinent disclosures herein, of copending applications Serial Numbers 198,893-4-2, said disclosures being filed on December 2, 1950, and pertinent disclosures in copending applications, Serial Numbers 416,433-4, filed March 15, 1954, and 610,623-4, filed September 18, 1956.

This invention relates to new compositions of matter, the 2-oxygenated substituent-8,13-dimethyl polyhydrophenanthrene-8-tertiary carbinols of the nuclearly saturated, monounsaturated and aromatized abietyl and d-pimaryl group of the phenanthrene series of compounds, and preparation thereof.

This invention particularly relates to new compositions such as the aceto, carboxy-ester and side chain halogenated-polyhydrophenanthrene tertiary carbinols of the structure

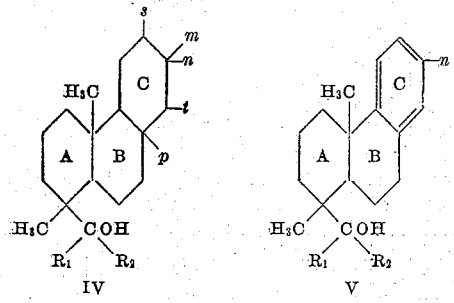

wherein $R_1$ and $R_2$ are each selected from the group consisting of alkyl and aryl radicals, $p$, $t$ and $s$ are each selected from the group consisting of the halogen and hydrogen, $m$ is selected from the group consisting of hydrogen, halogen and methyl and $n$ is selected from the group consisting of —COCH$_3$, —COOR (wherein R is selected from the group consisting of hydrogen, alkyl and aryl radicals), —CHOHCH$_3$, —CHOHCH$_2$OH, and —CHpCH$_2$t, and preparation thereof.

More particularly the invention relates to new compounds, the 2-aceto polyhydrophenanthrene-8-tertiary carbinols of the structure

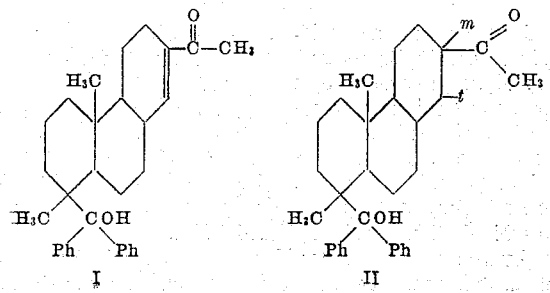

where in Ph designates phenyl and at least one of the $m$ and $t$ groups in II being halogen and the other a member of the group consisting of halogen and hydrogen, and the preparation thereof.

It is an object of the invention to prepare products which are intermediates, as utilized in said copending applications Serial Numbers 198,893-4-5-2 and 416,433-4, and 441,646 (based on 198,892), filed July 6, 1954 (the said applications are abandoned and refiled as applications Serial Nos. 610,623; 610,624 and 610,625, filed September 18, 1956), for the manufacture of therapeutics or which are therapeutics themselves, useful especially for the treatment of disorders related with deficiencies of the seminal organs, testicular and pituitary glands. For example, as described for the invention in copending applications (Serial Nos. 198,892 and 441,646) the novel products, herein, such as the 2-aceto-8-13-dimethyl nuclearly halogenated polyhydrophenanthrene-8-tertiary diphenyl carbinols or the corresponding 2-isopropyl carbinol halides of applications Serial Nos. 198,894 and 416,434, each is described as utilized for the preparation of such as the corresponding 7-ketoΔ(8,14)(1,2)-2-aceto-13 methyl polyhydrophenanthrene which latter is found to have androgenic properties and which also may be utilized further as a synthetic intermediate for such as the preparation of the natural cyclopentanopolyhydrophenanthrene hormones.

An effect of this invention is the production of said halogenated aceto-tertiary carbinols by subjecting the ring-C unsaturated aceto polyhydrophenanthrene tertiary carbinols to the action of halogens or halogen hydrides in suitable solvents such as acetic acid, chloroform, carbon tetrachloride, ether-alcohol mixtures and the like, such methods being disclosed in said copending applications Serial Numbers 198,893-4-5-2 and 416,433-4, and as applicable generally for the preparation of halogenated-2 substituted polyhydrophenanthrene tertiary carbinols such as starting materials utilized herein, said preparation for starting materials for this case as described therein and the material prepared in accordance with description in this case and used in the preparation of other materials which descriptions, as set forth in said applications, are hereby incorporated, herein.

Another object is the subjecting of the corresponding nuclearly saturated halogenated dihydrolevopimaryl tertiary diphenyl carbinols derivable from the Δ(6,7) and Δ(7,8) derivatives, to the action of suitable oxidizing agents at temperatures below 60° C. whereby while the nucleus is protected by halogens from oxidation, the side chain isopropyl group is converted to an aceto group.

Still another object of this invention is the transformation of the products of oxidation, the halogenated aceto polyhydrophenanthrene tertiary carbinols to such as said aceto carbinols such as the structure I, wherein the double bond has been restored in the ring system by splitting off hydrogen halide or halogen. This is achieved not only by those reagents mentioned in the examples, as by treatment with pyridine bases or with zinc dust in acetic acid, respectively, but also other reagents may be used such as treatment with alkaline agents or the like, such as alkali iodides in alcohol and in accordance with other methods described for instance by Houben "Die Methoden der Organischen Chemie" 2d edition, vol. 2, pp. 744–746 (1922).

Said starting materials, such as the nuclearly monounsaturated dihydrolevopimaryl tertiary carbinols and the corresponding halogenated tertiary carbinols such as correspond to the general formula $C_{32}H_{42}Omt$ and a structural formula such as

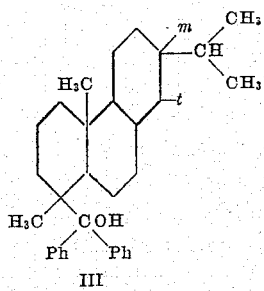

III wherein Ph designates phenyl and at least one of the $m$ and $t$ groups being halogen and the other a member of the group halogen and hydrogen include certain derivatives of the $\Delta(6,7)$ dihydrolevopimaryl tertiary carbinols such as the monochloride of Example 3, herein, corresponding to halogen derivatives of the $\Delta(2,3)$-8,13-dimethyl polyhydrophenanthrene-8-tertiary carbinols having ($—CH(CH_3)_2$) or ($—COCH_3$) in the 2-position thereof. Said derivatives may be treated as by dehydrohalogenation, set forth herein, to provide the corresponding 2,3 unsaturated derivatives, wherein as for the 1,2 unsaturated derivatives the double bond is adjacent to the 2-isopropyl or 2-aceto group.

In accordance with said methods as are described herein and description of preparations of starting materials as in the applications Serial Numbers 198,893–4–5–2 and 416,433–4 based thereon, suitable starting materials such as are illustrated in examples herein are noted to be summarized as in the Formulas IV and V above, wherein $R_1$, $R_2$, $s$, $m$, $t$ and $p$ have the meaning set forth above and $n$ may be $(CH(CH_3)_2)$, $(—CH=CH_2)$, $(—CHOHCH_3)$ and $(CHOHCH_2OH)$ or $(CHp—CH_2t)$ and the like and said starting materials may be utilized by such means as are illustrated herein, for the preparation of corresponding 2-oxygenated substituent polyhydrophenanthrene tertiary carbinols selected from the group designated by Formulations IV and V.

The new aceto-carbinols obtained according to this invention preferably are prepared by treating such as the corresponding nuclearly unsaturated dihydrolevopimaryl diphenyl carbinols to saturate the double bond, for example, by adding on halogen or halogen hydride, and subsequently oxidizing the halogenated carbinol preferably with a mixture of an oxidizing chromium compound such as hexavalent chromium oxide, a bichromate, chromate or chromyl compound and the like and preferably in admixture with an orthophosphate producing compound such as orthophosphoric acid and the like at temperatures below 60° C. The intermediate halogenated aceto polyhydrophenanthrene diphenyl carbinols may be treated, for example, the dibromide or dichloride, with powdered zinc in acetic acid or the monochloride with pyridine at temperatures below 70° C. to obtain the aceto polyhydrophenanthrene carbinol I. In like manner the halogenated d-pimaryl tertiary carbinols may be converted to corresponding 2-carboxy-R or 2-aceto derivatives.

I have found that it is desirable to control the temperatures during oxidation and dehalogenation to below 70° C., preferably below 60° C. to avoid excessive production of by-product acids and dehydrated products.

Although a preferred scheme for the oxidation process of this invention comprises the reaction of such as the suitably protected halogenated dihydrolevopimaryl tertiary carbinols which have the Formula III in glacial acetic acid with a mixture of an oxidizing chromium compound such as $CrO_3$ and the like, and an at least sufficient amount of an orthophosphate producing compound such as $H_3PO_4$ to remove all the trivalent chromium-ion formed during reaction as an insoluble solid phase at a temperature between 30° and 60° C., it will be immediately apparent to one skilled in the art that the proportions and concentrations of the reactants, as well as the temperature and period of reaction may be varied within wide limits and the acetic acid medium may be replaced by a tertiary alcohol or other inert solvents such as carbon tetrachloride and acetone. For example, the oxidation may be carried out over a fairly wide range of temperature varying from about 5° C. to as high as 60° C. At the higher temperatures the oxidation is complete within a few minutes while at 5° C. the reaction may take several hours. The oxidizing chromium compound may be $CrO_3$, a bichromate, chromate or chromyl compound while the orthophosphate ion producing compound may be one of the orthophosphoric type of compounds which include the ortho, meta and pyrophosphoric acid and their acid salts such as may revert to orthophosphates on hydration.

The following examples serve to illustrate this invention, without, however, limiting the invention to them.

*Example 1*

To 210 grams of 7,8-dibromdihydrolevopimaryl tertiary diphenyl carbinol dissolved in 3 liters of glacial acetic acid a mixture of 50 grams of $CrO_3$ and 200 grams of 85% aqueous orthophosphoric acid are added dropwise with stirring while maintaining the temperature between 30 and 50° C. The reaction is completed by stirring for 90 minutes after addition of the $CrO_3$ and the chromic phosphate precipitate is removed by filtration and washed with ether to recover occluded organic products. The filtrate is watered out to 10 liters with water and freed of acetic and phosphoric acids by filtration. The combined organic products are recovered in ether and dried by distillation under vacuo. The aceto dibrompolyhydrophenanthrene diphenyl carbinol is recovered in the residue by washing the residue with petroleum ether, B. P. 30 to 60° C. It is purified further by washing the ether solution of the residue with 5% aqueous alkali (NaOH) to remove by-product acids. The recovery of aceto dibrompolyhydrophenanthrene diphenyl carbinol was 200 grams, a 95% yield which analyzed 26.0% bromine, refractive index 1.5881.

The sample of 195 grams of aceto-dibrompolyhydrophenanthrene diphenyl carbinol is dissolved in 2 liters of glacial acetic acid and treated portionwise at 50° with 300 gms. of zinc dust over a period of 2 hours. The mixture is then warmed to 90° C., for 15 minutes and filtered and the solutionn is watered out to 6 liters volume. The organic residue is washed free of salts recovered in ether solution and dried in vacuo. By exhaustive petroleum ether extraction of the residue 130 gms. yield of crude aceto polyhydrophenanthrene diphenyl carbinol I was obtained which analyzed 1.3% bromine, 83.2% C, 8.5% H.

*Example 2*

225 grams of 7,8-dichlordihydrolevopimaryl tertiary diphenyl carbinol are oxidized as in Example 1, to provide 215 grams of 7-aceto-7,8-dichlordihydrolevopimaryl tertiary diphenyl carbinol, 13.4% chlorine. This product yielded 125 gms. of crude aceto polyhydrophenanthrene diphenyl carbinol I when dehalogenated as in Example 1.

*Example 3*

19 grams of 7-monochlordihydrolevopimaryl tertiary diphenyl carbinol, prepared from dihydrolevopimaryl tertiary diphenyl carbinol by addition of HCl to the double bond, were oxidized by a mixture of 10 grams of $CrO_3$ and 38 grams of 85% aqueous orthophosphoric acid as in Example 1. Sixteen grams of a product was recovered as in Example 1, which had 7.3% Cl corresponding to the 7-aceto-monochlordihydrolevopimaryl tertiary diphenyl carbinol. This product yielded 12 grams of the 2-aceto polyhydrophenanthrene tertiary diphenyl carbinol I when dehydrohalogenated with hot pyridine on the steam bath.

Example 4

The method (#) of preparation of 7-carboxy-methyl d-pimaryl tertiary diphenyl carbinol as disclosed in Example 4 of copending application Serial No. 198,892 (refiled as 441,646), is utilized herein to prepare the corresponding carboxy-phenyl derivative. 15 grams of 8,14-dibrom-7-hydroxy-ethyl d-pimaryl methyl-ester is treated with 30 grams of $P_2O_5$ in 200 cc. glacial acetic acid and the dibrom-d-pimaryl methyl-ester so produced is treated with a mixture of 4 grams of $CrO_3$ and 50 grams of 85% aqueous $H_3PO_4$ at 50° C. and the product 7-carboxy-8,14-dibrom-d-pimaryl ester is treated with 10 grams powdered zinc to yield the corresponding $\Delta(8,14)$ derivative which is treated with PhMgBr in accordance with the process as set forth in applications Serial No. 198,893 (refiled as Ser. No. 416,433) to provide the 7-carboxy-$\Delta(8,14)$ d-pimaryl tertiary diphenyl carbinol which is esterified with phenol and treated with HCl in ether-alcohol to provide 2-carboxy-phenyl-11-chloro-2,8,13-trimethyl polyhydrophenanthrene-8-tertiary diphenyl carbinol. Alternatively, 15 grams of d-pimaryl tertiary diphenyl carbinol treated with dilute (5%) $KMnO_4$ in a 50-50 mixture of aqueous acetone to yield the corresponding 7-glycol which may be brominated to yield the 14,8-dibrom-7-glycol-d-pimaryl tertiary diphenyl carbinol which is treated with 4 grams of $CrO_3$ and 50 grams 85% aqueous $H_3PO_4$ at 60° C. thus providing the 2-carboxy-11,1-dibrom-2,8,13-trimethyl polyhydrophenanthrene-8-tertiary diphenyl carbinol which may be esterified with alkyl alcohols or phenols to produce the corresponding -2-carboxy-R-derivatives, thereof. In like manner the corresponding tertiary alkyl carbinols, for example, the tertiary dimethyl-2-carboxy-R carbinols may be prepared. # Said method comprises the following: 10 grams of 7-carboxy methyl diphenyl tertiary carbinol prepared from nuclearly saturated dibrom-d-pimaryl methyl ester by oxidation of the side chain, dehalogenation, grignardization and esterification having the structure

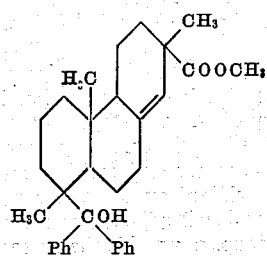

wherein Ph is phenyl, dissolved in 200 grams of glacial acetic acid is treated with 4 grams of bromine with stirring for 30 minutes, thereby providing the 11,1-dibrom-2-carboxy-methyl-2,8,13-trimethyl polyhydrophenanthrene-8-tertiary diphenyl carbinol.

Example 5

10 grams of the 7-hydroxy-ethyl d-pimaryl tertiary diphenyl carbinol prepared as in Example 4, by omitting the $P_2O_5$ and bromination treatment is obtained by treating the 7-hydroxy ethyl d-pimaryl methyl-ester with PhMgBr as set forth in copending application Serial No. 416,433 (based on Ser. No. 198,893) and the product tertiary diphenyl carbinol is treated with 4 grams of $Br_2$ in 200 cc. glacial acetic acid to produce 9 grams of 2,8,13-trimethyl-1,1-dibrom-2-hydroxyethyl - polyhydrophenanthrene-8-diphenyl carbinol which on treatment with 4 grams of $CrO_3$ with 50 grams of 85% $H_3PO_4$ at 50° C. yields 6 grams of 2-aceto-2,8,13-trimethyl-11,1-dibrom-polyhydrophenanthrene-8-diphenyl carbinol.

Example 6

2 grams of dehydroabietyl tertiary diphenyl carbinol prepared as in copending application Ser. No. 416,433 and (198,893) is treated with 4 grams of $CrO_3$ and 50 grams of $H_3PO_4$ at 50° C. to yield 1.5 grams of 2-aceto-10-keto-8,13-dimethyl polyhydrophenanthrene-8-diphenyl carbinol having the structure in which the C ring is aromatic.

In the above examples such as the 2-hydroxy-ethyl and 2-carboxy tertiary carbinol derivative may be freed from the 2-hydrocarbon substituted carbinols by extraction of the latter by petroleum ether or hexane.

The nomenclature and numbering are defined in this specification and claims for the phenanthrene series those found in Journal of the American Chemical Society 55, 3905(1933), and those for the "abietic series" conform with the systems in Journal American Chemical Society 60, 159(1938), and Fieser and Fieser Natural Products Related to Phenanthrene, chap. II, 3rd ed. (1949), Reinhold Publishing Co., New York, N. Y.

The said abietyl and d-pimaryl group of phenanthryl compounds is noted to comprise the "abietic series" which includes under the term abietyl:abietic, neoabietic, dehydroabietic and levopimaric whose carbon skeleton and numbering is noted in Formulation 1, below to

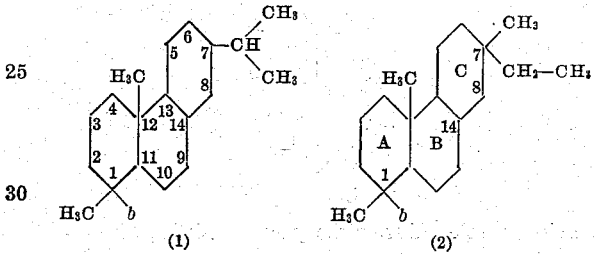

(1)  (2)

differ from (2) that of the group comprised under the term d-pimaryl which includes the d-pimaric and iso-d-pimaric derivatives only in the side chain on position 7 defined as in Fieser and Fieser. It is noted that $$b = COOH, -COH-Ph_2, CH_2OH$$

for various groups of isomeric acids, tertiary carbinols, and alcohols.

In particular, the term levo pimaryl, used herein, in conformity with Fieser and Fieser, loc. cit., particularly pp. 41 and 58, denotes the conjugated diene dimethyl tricyclic residue

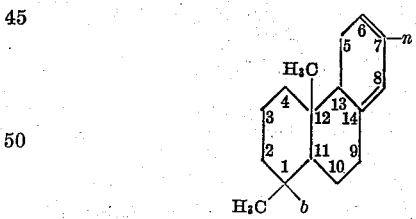

having "abietic series" numbering and terms dihydrolevopimaryl denotes in general corresponding partially hydrogenated residues, thereof, wherein b has the meaning defined above and n may be $CH(CH_3)_2$, $-COCH_3$, said hydrogenated residues having C ring structures

and

which may result by 1:4 and 1:2 hydrogen addition to the conjugated diene system, and wherein n refers to substituents appropriately specified herein.

Said dihydrolevopimaryl derivatives are noted to be disclosed herein as preparable from such as the tertiary carbinols of example 3, herein, such as the 7-monochlor derivatives from which by dehydrohalogenation as disclosed herein, may provide the Δ(2,3) 8,13 dimethyl 2-isopropyl or 2-aceto polyhydrophenanthrenes-8-tertiary carbinols from which the corresponding 2,3 dihalides may be prepared according to the halogenated process disclosed as in copending applications Serial Numbers 416,434 (198,894)—198,895 and 198,892.

The preparations for starting materials for this case are described in copending applications Serial Numbers 416,433-4 and (198,893-4-5-2) which descriptions are hereby incorporated herein.

The materials prepared in accordance with descriptions in this case are used in the preparation of other materials as set forth in copending cases Serial Numbers 416,433-4 (198,893-4-5-2) which descriptions as set forth in said cases is hereby incorporated, herein.

The foregoing may be summarized as follows.

The starting polyhydrophenanthrene compound may be represented by the formula

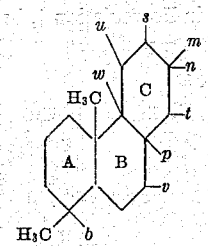

wherein $n$ is selected from the group consisting of $$-CH(CH_3)_2, \quad -CH=CH_2, \quad -CHOHCH_3$$
$$\text{and} \quad -CHOHCH_2OH.$$

This material is oxidized by means of oxidizing agents, preferably a hexavalent chromium compound, preferably with a mixture of hexavalent chromium compound and an orthophosphate producing compound, at a temperature preferably in the range of about 5° to about 70° C., and this produces a compound having a 2-oxygenated substituent $n$ in a formula

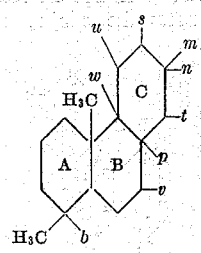

wherein $n$ is selected from the group consisting of —COCH₃, and —COOR.

In all the foregoing formulas $b$ is selected from the group consisting of —COOR (wherein R is selected from the group consisting of hydrogen, alkyl and aryl radicals), and —COHR₁R₂ (wherein $R_1$ and $R_2$ are each selected from the group consisting of the alkyl and aryl radicals), $v$ is selected from the group consisting of $=O$ and $=H_2$, $w$ and $u$ are each selected from the group consisting of hydrogen and one end of a double bond, $s$, $t$ and $p$ are each selected from the group consisting of hydrogen, halogen and one end of a double bond, $m$ is selected from the group consisting of hydrogen, halogen, methyl and one end of a double bond, said ends of double bonds being in a position selected from the group consisting of the $w$ and $u$, $s$ and $m$, $m$ and $t$, and $t$ and $p$ positions.

The group of inventions comprised in the copending applications as noted below relates to converting the readily available pine resin acids to materials having androgenic activity, which materials may be further converted to natural cyclopentano polyhydrophenanthrene type of hormones. They are described and claimed in copending applications Serial No. 610,623, Serial No. 610,624, Serial No. 428,852, Serial No. 610,625 and Serial No. 647,986.

In this overall process an ester derivative of a pine resin acid is converted to a tertiary carbinol by grignardization.

In this connection there are included an improved method for obtaining high yields of carbinol of the order of 95% of theory by operation at elevated temperatures with high boiling solvents, and also a novel method of recovery of the high yield of desired carbinol products in substantially pure form by degradation and removal of the unreacted acid esters therefrom, and also a method for rearranging and dehydrating the tertiary carbinol product to corresponding tertiary diphenyl-methyl compounds. These novel features and intermediate compounds are described and claimed in copending application Serial No. 610,623, filed Sept. 18, 1956 as a continuation-in-part of Serial No. 416,433, filed March 15, 1954, as a continuation-in-part of application Serial No. 198,893 filed Dec. 2, 1950, both of the latter now abandoned.

The class of nuclearly monounsaturated tertiary carbinols obtained thereby are converted to corresponding saturated halides by halogenation or hydrohalogenation which features and carbinol halide products are described and claimed in copending application Serial No. 610,624 filed Sept. 18, 1956, as a continuation-in-part of Serial No. 416,434 filed March 15, 1954, as a continuation-in-part of application Serial No. 198,894 filed Dec. 2, 1950, both of the latter now abandoned.

The resulting carbinol halides and the corresponding C-ring aromatized tertiary carbinols (obtained as above from the corresponding aromatized pine resin acids) are subjected to selective oxidation which converts the 2-side chain of the polyhydrophenanthrene tertiary carbinol to an alpha carbonyl group, which features and carbinol products are described and claimed in the present application filed May 10, 1954, as a continuation-in-part of application Serial No. 198,895 filed Dec. 2, 1950, now abandoned.

The carbinol in the material obtained by any of the above discussed methods is rearranged and dehydrated to provide a tertiary diphenyl methyl compound, an (8,14) unsaturated double bond is formed by removal of elements of water from the rearranged carbinol and the resulting compounds are oxidized on the active methylene group thereby formed which is adjacent to the said tertiary diphenyl methyl group, to provide the corresponding alpha-beta unsaturated 7-keto polyhydrophenanthrene compounds, which are shown to have androgenic and anabolic activities, which features and compounds are described and claimed in the application Serial No. 610,625, filed Sept. 18, 1956, as a continuation-in-part of Serial No. 441,646 filed July 6, 1954, which is a continuation-in-part of application Serial No. 198,892 filed Dec. 2, 1950, both of the latter now abandoned.

In the oxidation step, there are obtained as side products corresponding polyhydronapthone propionic acids and lactones, and these may be converted to the corresponding above mentioned 7-keto polyhydrophenanthrene compounds by treatment with an acetylating agent as by treatment with phenyl acetosodium hydride reagent (or with methyl halide magnesium salts) which features and intermediate polyhydronapthalene compounds are described and claimed in copending application Serial No. 647,986, filed March 25, 1957, as a continuation-in-part of Serial No. 390,747 filed Nov. 6, 1953, as a continuation-in-part of application Serial No. 260,231 filed June 6, 1951, both of the latter now abandoned.

The above mentioned 7-keto-polyhydrophenanthrenes may be converted to suitable corresponding acetic or propionic acid ester derivatives which may be cyclyzed to corresponding known cyclopentanopolyhydrophenanthrene hormone intermediates, which may be converted by well known methods to natural steroid hormones.

In these fields, two types of nomenclature and numbering are established, (1) in terms of the structural isomers of the abietyl and d-pimaryl types wherein the tricyclic numbering is shown in the formulas given as carbon skeletons

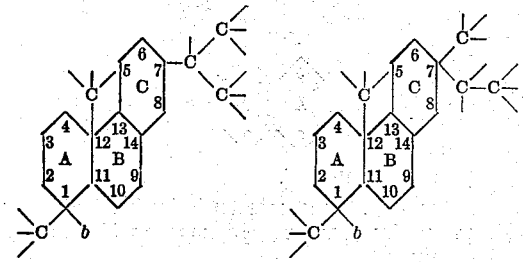

wherein b is a tertiarily bound group such as

—COOR, —COHPh₂ and —CH₂OH, —CH₂NH₂ wherein R and Ph have the definition defined herein and (2) in terms of a polyhydrophenanthrene nomenclature and numbering, wherein the tricyclic numbering is as shown in the same carbon skeletons, as shown in the formula below, both of

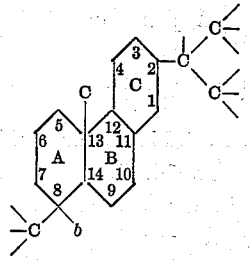

which are used herein, to conform with both as used in Fieser and Fieser, Natural Products Related to Phenanthrene, chap. 2, 3rd ed., Reinhold Publ. Co., N. Y., see pp. 41, 64 and 85, thereof, particularly.

I claim:

1. A process for the production of an 8,13-dimethyl polyhydrophenanthrene compound having as an 8-substituent a tertiarily bonded radical selected from the group consisting of a tertiary carbinol, a carboxyl, a carboalkoxy and a carboaryloxy radical and having as a 2-substituent an α-carbonylated aliphatic radical selected from the group consisting of —COCH₃ and —COOH from a corresponding 8,13-dimethyl polyhydrophenanthrene reactant compound having said tertiarily bonded 8-substituent and having as a 2-substituent a member of the group consisting of —CH(CH₃)₂, —CH=CH₂, —CHOHCH₃ and —CHOHCH₂OH, the nucleus of which reactant compound is resistant to rupture by oxidation under the process conditions and the 13-angular methyl group and the said 8-tertiarily bonded substituent are in trans relationship, which process comprises subjecting said reactant to the action of a hexavalent chromium compound under oxidizing conditions, whereby said compound having said 2-α-carbonylated substituent is produced.

2. A process for the production of an 8,13-dimethyl polyhydrophenanthrene 8-tertiary carbinol having as a 2-substituent an α-carbonylated aliphatic radical selected from the group consisting of —COCH₃ and —COOH, from a corresponding 8,13-dimethyl polyhydrophenanthrene 8-tertiary carbinol reactant compound having as a 2-substituent an aliphatic radical selected from the group consisting of —CH(CH₃)₂, —CH=CH₂, —CHOHCH₃ and —CHOHCH₂OH, the nucleus of which reactant is resistant to rupture by oxidation under the process conditions and the 13-angular methyl and 8-tertiary carbinol groups are in trans relationship, which process comprises subjecting said carbinol reactant compound to the action of a hexavalent chromium compound under oxidizing conditions, whereby said tertiary carbinol having said 2-α-carbonylated substituent is produced.

3. A process of claim 1, wherein the reactant compound is added to a mixture of a hexavalent chromium compound and an orthophosphate producing compound and the resulting mixture is subjected to a temperature in the range of 5° to below about 70° C.

4. A process of claim 3, wherein a product having an aceto group as a 2-substituent is produced.

5. A process of claim 1, wherein the 2-substituent is a carboxyl group, followed by subjecting the product to the action of a hydroxyl containing hydrocarbon esterification agent, said agent being a member of the group of alkyl and aryl monohydric alcohols, whereby a corresponding product having a 2-carboxylic ester substituent is produced.

6. A process of claim 3, wherein the nucleus contains at least one and at most two halogens.

7. A process of claim 6, wherein a carbinol having an aceto group as a 2-substituent is produced.

8. A process of claim 6, followed by subjecting the product to the action of a halogen removing agent whereby a product having at least one and at most four nuclear double bonds is produced.

9. A process of claim 8, wherein a carbinol having one nuclear double bond in the 1:2 position is produced.

10. A process of claim 2, wherein the tertiary carbinol is a diphenyl carbinol.

11. A process of claim 6, wherein the nucleus is 1,2-dibromo substituted.

12. A process of claim 8, wherein a carbinol having one nuclear double bond in the 1:2 position is produced from a 1,2-dibromo carbinol.

13. An 8,13-dimethyl polyhydrophenanthrene-8-tertiary carbinol having as a 2-substituent an α-carbonylated radical selected from the group consisting of —COCH₃ and —COOR (wherein R is a member of the group consisting of hydrogen, alkyl and aryl radicals) wherein the 13-angular methyl and 8-tertiary carbinol groups are in trans relationship and the phenanthrene nucleus contains at most four double bonds, said double bonds are located in rings B and C of the structural skeleton

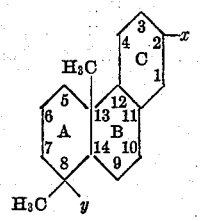

wherein y represents the said 8-tertiary carbinol group and x represents the said 2-substituent group.

14. A carbinol of claim 13, wherein the phenanthrene nucleus contains at most two double bonds.

15. A carbinol of claim 13, having a tertiary diphenyl carbinol group as an 8-substituent.

16. A carbinol of claim 13, having at least one and at most two halogens in the nucleus.

17. A carbinol of claim 13, having an aceto group as a 2-substituent.

18. A carbinol of claim 13, having a carboxylic group as a 2-substituent.

19. A carbinol having a formula

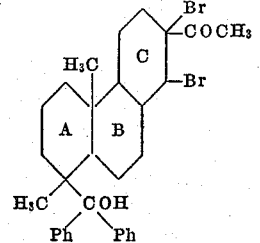

wherein Ph is phenyl.

20. A carbinol having a formula

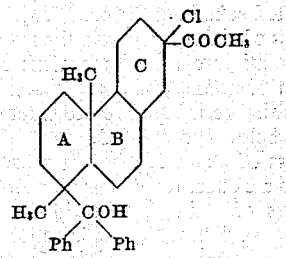

wherein Ph is phenyl.

21. A carbinol having a formula

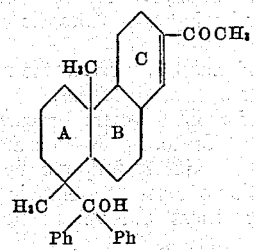

wherein Ph is phenyl.

22. A carbinol having a formula

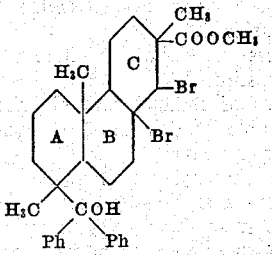

wherein Ph is phenyl.

23. An 8,13-dimethyl polyhydrophenanthrene compound having as an 8-substituent a tertiarily bonded α-carbonylated radical selected from the group consisting of a carboxy, a carboalkoxy and a carboaryloxy radical and having as a 2-substituent an α-carbonylated radical selected from the group consisting of —COCH$_3$ and —COOR (wherein R is selected from the group consisting of hydrogen, alkyl and aryl radicals) wherein the 13-angular methyl and said 8-tertiarily bonded α-carbonylated substituents are in trans relationship, and the phenanthrene nucleus having at most four double bonds, said double bonds being located in the B and C rings of the structural skeleton

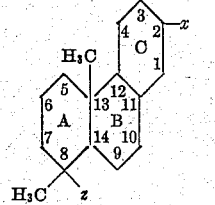

wherein z represents the said tertiarily bonded 8-α-carbonylated substituent and x represents the said 2-α-carbonylated substituent.

24. A compound of claim 23, having an aceto group as the 2-substituent.

25. A compound having a formula

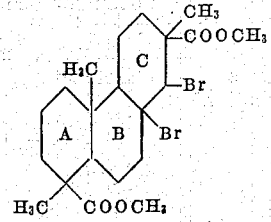

References Cited in the file of this patent
UNITED STATES PATENTS

| | | |
|---|---|---|
| 2,323,584 | Schoeller et al. | July 6, 1943 |
| 2,703,809 | Ritchie | Mar. 8, 1955 |
| 2,744,101 | Subluskey | May 1, 1956 |
| 2,750,368 | Sanderson | June 12, 1956 |

OTHER REFERENCES

Zeiss: J. Am. Chem. Soc., vol. 70, pp. 858–860 (1948).
Fieser et al.: Natural Products Related to Phenanthrene, pp. 61–63 (1949).
Merck Index, 6th ed. (1952), page 760.